US006847978B2

(12) United States Patent
Ellis et al.

(10) Patent No.: US 6,847,978 B2
(45) Date of Patent: Jan. 25, 2005

(54) AUTOMATIC DATABASE STATISTICS CREATION

(75) Inventors: Nigel R. Ellis, Redmond, WA (US); Rodger N. Kline, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 442 days.

(21) Appl. No.: 10/034,806

(22) Filed: Dec. 26, 2001

(65) Prior Publication Data

US 2002/0087518 A1 Jul. 4, 2002

Related U.S. Application Data

(63) Continuation of application No. 09/213,087, filed on Dec. 16, 1998.

(51) Int. Cl.$^7$ .............................................. G06F 17/30
(52) U.S. Cl. ....................................................... 707/102
(58) Field of Search ................................ 707/2, 5, 102, 707/101, 1, 3, 4, 7, 104.1; 709/219; 310/395.4; 711/160

(56) References Cited

U.S. PATENT DOCUMENTS

| | | | |
|---|---|---|---|
| 5,588,150 A | 12/1996 | Lin et al. ......................... | 707/1 |
| 5,630,120 A | 5/1997 | Vachey ......................... | 707/102 |
| 5,668,987 A | 9/1997 | Schneider ....................... | 707/3 |
| 5,806,061 A | 9/1998 | Chaudhuri et al. ............. | 707/3 |
| 6,012,054 A | 1/2000 | Seputis .......................... | 707/3 |
| 6,052,689 A | 4/2000 | Muthukrishnan et al. ... | 707/101 |
| 6,065,007 A | 5/2000 | Muthukrishnan et al. ...... | 707/7 |
| 6,092,062 A | 7/2000 | Lohman et al. ................. | 707/2 |
| 6,108,658 A | 8/2000 | Lindsay et al. ............. | 707/101 |
| 6,178,449 B1 | 1/2001 | Forman et al. ............. | 709/224 |
| 6,205,441 B1 | 3/2001 | Al-omari et al. ............... | 707/2 |
| 6,327,587 B1 * | 12/2001 | Forster .......................... | 707/2 |
| 6,343,288 B1 * | 1/2002 | Lindsay et al. ................. | 707/7 |
| 6,366,901 B1 * | 4/2002 | Ellis .............................. | 707/2 |
| 6,460,045 B1 * | 10/2002 | Aboulnaga et al. .......... | 707/102 |
| 6,470,330 B1 * | 10/2002 | Das et al. ....................... | 707/2 |

OTHER PUBLICATIONS

Soukup, R., "Inside SQL Server™ 6.5", Microsoft® Programming Series, Microsoft® Press, 1997 pp. 1–32(renumbered).

Chaudhuri, et al., "Automating statistics management for query optimizer," *Knowledge and Data Engineering*, IEEE publication Mar. 2000, 13(1), 7–20.

Dietker, et al., "A tool for nesting and clustering large objects," *Scientific and Statistical Database Management Proc.*, 12$^{th}$ Intern. Confer., IEEE publication Jul. 2000, 169–181.

Soukup, R., "Inside SQL Server™ 6.5," Microsoft® Programming Series, Microsoft® Press, 1997.

* cited by examiner

*Primary Examiner*—Diane D. Mizrahi
(74) *Attorney, Agent, or Firm*—Woodcock Washburn LLP (57) ABSTRACT

A system for automatic statistics creation comprises a query optimizer which automatically generates statistics derived from data in a database and selects an executable procedure from a plurality of procedures that operate on data in a database using the automatically generated statistics. A counter is maintained of updates made to each statistic that has been automatically generated. If the counter breaches a threshold, the automatically generated statistic is removed from the database.

17 Claims, 11 Drawing Sheets

AUTOMATIC DATABASE STATISTICS CREATION

CROSS REFERENCE TO RELATED APPLICATIONS

This Application: is a continuation of application Ser. No. 09/213,087 filed Dec. 16, 1998.

This application is related by subject matter to the inventions disclosed in commonly assigned U.S. patent application Ser. No. 09/212,933, filed on even date herewith, and now U.S. Pat. No. 6,366,901, entitled "Automatic Database Statistics Maintenance and Plan Regeneration."

TECHNICAL FIELD

The present invention relates generally to database systems, and more particularly to a system for automatically generating statistics for data stored in a database.

BACKGROUND OF THE INVENTION

A relational database is a collection of related data that is organized in related two-dimensional tables of columns and rows. The data stored in a relational database is typically accessed by way of a user-defined query that is constructed in a query language such as Structured Query Language (SQL). A SQL query is non-procedural in that it specifies the objective or desired result of the query in a language meaningful to a user but does not define the steps to be performed, or the order of the steps in order to accomplish the query.

When a SQL query is applied to a database, the relational database management system (RDBMS) processes the non-procedural query and develops a plurality of procedural execution plans, any one of which could be employed to implement the objectives of the SQL query. While each of the execution plans may fulfill the objectives of the SQL query, each has a different cost (in terms of processing cycles and logical I/Os) associated with it. The relational database management system attempts to select the execution plan which is most efficient, i.e. has the least overall cost. Generally, the selection is made on the basis of statistics that are derived from the data in the database and maintained by the RDBMS. For example, a database may record the number of distinct values in a pre-designated index column along with a histogram of the values distributed across the column. Using these and other statistics, the database system makes an educated guess of the cost associated with each execution plan, selects the most efficient plan, and stores the selected plan in an area of memory sometimes referred to as an execution plan cache. On subsequent invocations of the same SQL query, rather than re-traverse the process of identifying the most efficient execution plan, the database system refers to the execution plan cache and selects the previously identified optimal execution plan.

In existing database systems, statistics are generated only for specific tables that are pre-defined by a database administrator. As a consequence, the situation often arises that statistics have not been generated that would have been used in selecting an execution plan if available. In such cases, the database system relies upon rough estimates or "guesses" of the statistics. Relying upon guesses rather than actual statistics introduces inaccuracies to the process and can lead to the selection of a less than optimal execution plan. As a consequence, database queries may take longer and use more resources than optimally necessary.

In existing systems, it is theoretically possible to avoid guessing as to statistics by configuring the system to build statistics on every column in the database. In reality, however, such a configuration is impracticable due to the overhead associated with maintaining statistics on such a large group of statistics. Guessing as to statistics might also be avoided by configuring the system to collect statistics which cover all predicates submitted to the database. This task would be very complex as it requires that the database administrator know a-priori the complete set of queries (workload) which would be submitted to the system. In many database systems, this problem is intractable as many users of the database system rely on tools which automatically generate queries.

Thus, there is a need in the art for a system and method whereby statistics are automatically generated as needed for data that is accessed by an execution plan. The system should automatically remove selected portions of the automatically generated statistics to avoid the accumulation of statistics across all columns in the database.

SUMMARY OF THE INVENTION

The present invention is directed toward remedying these shortcomings by automatically generating statistics as needed. According to the invention, during the process of generating an execution plan, the names are accumulated of the columns which are processed by the execution plan but for which statistics do not exist. After checking that these columns are of a type for which statistics may be generated, the system generates the statistics. Thereafter, an optimal execution plan is selected based upon the actual statistics rather than guesses.

According to another aspect of the invention, a counter is maintained for each automatically generated statistic of the number of updates made to the statistic. When the counter reaches a threshold, the automatically generated statistic is deleted.

BRIEF DESCRIPTION OF THE DRAWINGS

Other features of the invention are further apparent from the following detailed description of presently preferred exemplary embodiments of the invention taken in conjunction with the accompanying drawings, of which.

DETAILED DESCRIPTION OF THE INVENTION

Overview

The present invention provides a database management system wherein statistics regarding data stored in the database are automatically generated as needed during query processing. When a query is processed, the DBMS recognizes that statistics have not been generated for some component of data accessed by an execution plan. The statistics are automatically generated and the query optimization proceeds with selecting an execution plan using actual statistics where otherwise guesses may have been used. By using actual statistics as opposed to guesses, the database system is rendered more reliable and efficient.

Prior to explaining the details of the invention, it is useful to provide a description of a suitable exemplary environment in which the invention may be implemented.

Exemplary Operating Environment

1. A Computer Environment

Figure 1:
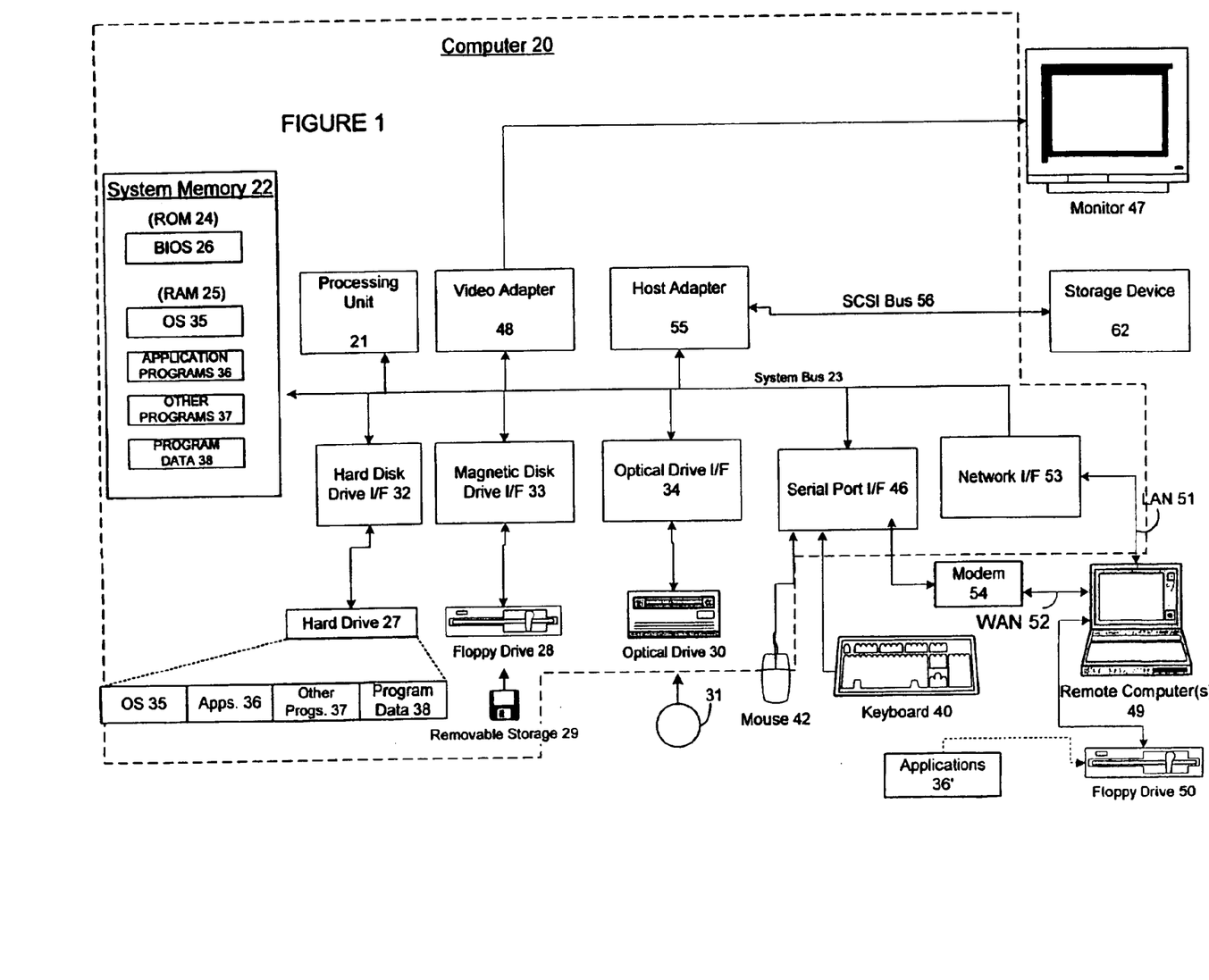
FIG. 1 is a block diagram representing a computer system in which aspects of the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a workstation or server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCS, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment. Further, as used herein, the term "computer readable medium" includes one or more instances of a media type (e.g., one or more floppy disks, one or more CD-ROMs, etc.).

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

2. A Network Environment

Figure 2:
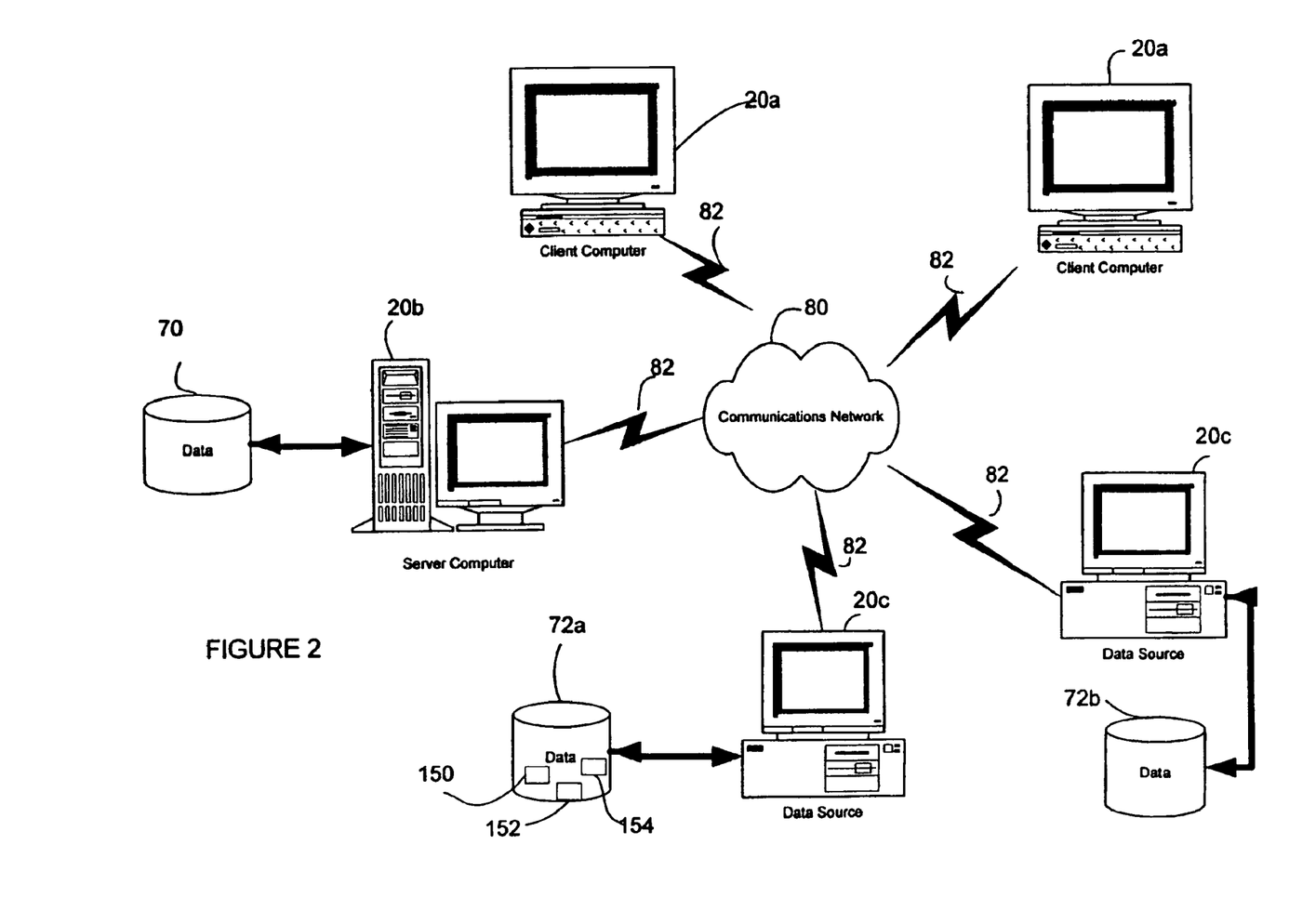
FIG. 2 is schematic diagram representing a network in which aspects of the present invention may be incorporated.

FIG. 2 illustrates an exemplary network environment in which the present invention may be employed. Of course, actual network and database environments can be arranged in a variety of configurations; however, the exemplary environment shown here provides a framework for understanding the type of environment in which the present invention operates.

The network may include client computers 20a, a server computer 20b, data source computers 20c, and databases 70 and 72. The client computers 20*a* and the data source computers 20*c* are in electronic communication with the server computer 20*b* via communications network 80, e.g., the Internet. Client computers 20*a* and data source computers 20*c* are connected to the communications network by way of communications interfaces 82. Communications interfaces 82 can be any one of the well-known communications interfaces such as Ethernet connections, modem connections, and so on.

Server computer 20*b* provides management of database 70 by way of database server system software, described more fully below. As such, server 20*b* acts as a storehouse of data from a variety of data sources and provides that data to a variety of data consumers.

In the example of FIG. 2, data sources are provided by data source computers 20*c*. Data source computers 20*c* communicate data to server computer 20*b* via communications network 80, which may be a LAN, WAN, Intranet, Internet, or the like. Data source computers 20*c* store data locally in databases 72*a*, 72*b*, which may be relational database servers, excel spreadsheets, files, or the like. For example, database 72*a* shows data stored in relational database tables 150, 152, and 154 which are described below with reference to FIG. 3. The data provided by data sources 20*c* may be combined and stored in a large database such as a data warehouse maintained by server 20*b*.

Client computers 20*a* that desire to use the data stored by server computer 20*b* can access the database 70 via communications network 80. Client computers 20*a* request the data by way of SQL queries (e.g., update, insert, and delete) on the data stored in database 70.

3. Query Processing Generally

A database is a collection of related data. In one type of database, a relational database, data is organized in a two-dimensional column and row form called a table. A relational database typically includes multiple tables. A table may contain zero or more records and at least one field within each record. A record is a row in the table that is identified by a unique numeric called a record identifier. A field is a subdivision of a record to the extent that a column of data in the table represents the same field for each record in the table. A database generally will also include associative structures. An example of an associative structure is an index, typically, but not necessarily, in a form of B-tree or hash index. An index provides for seeking to a specific row in a table with a near constant access time regardless of the size of the table. Associative structures are transparent to users of a database but are important to efficient operation and control of the database management system. A database management system (DBMS), and in particular a relational database management system (RDBMS) is a control system that supports database features including, but not limited to, storing data on a memory medium, retrieving data from the memory medium and updating data on the memory medium.

Figure 3:
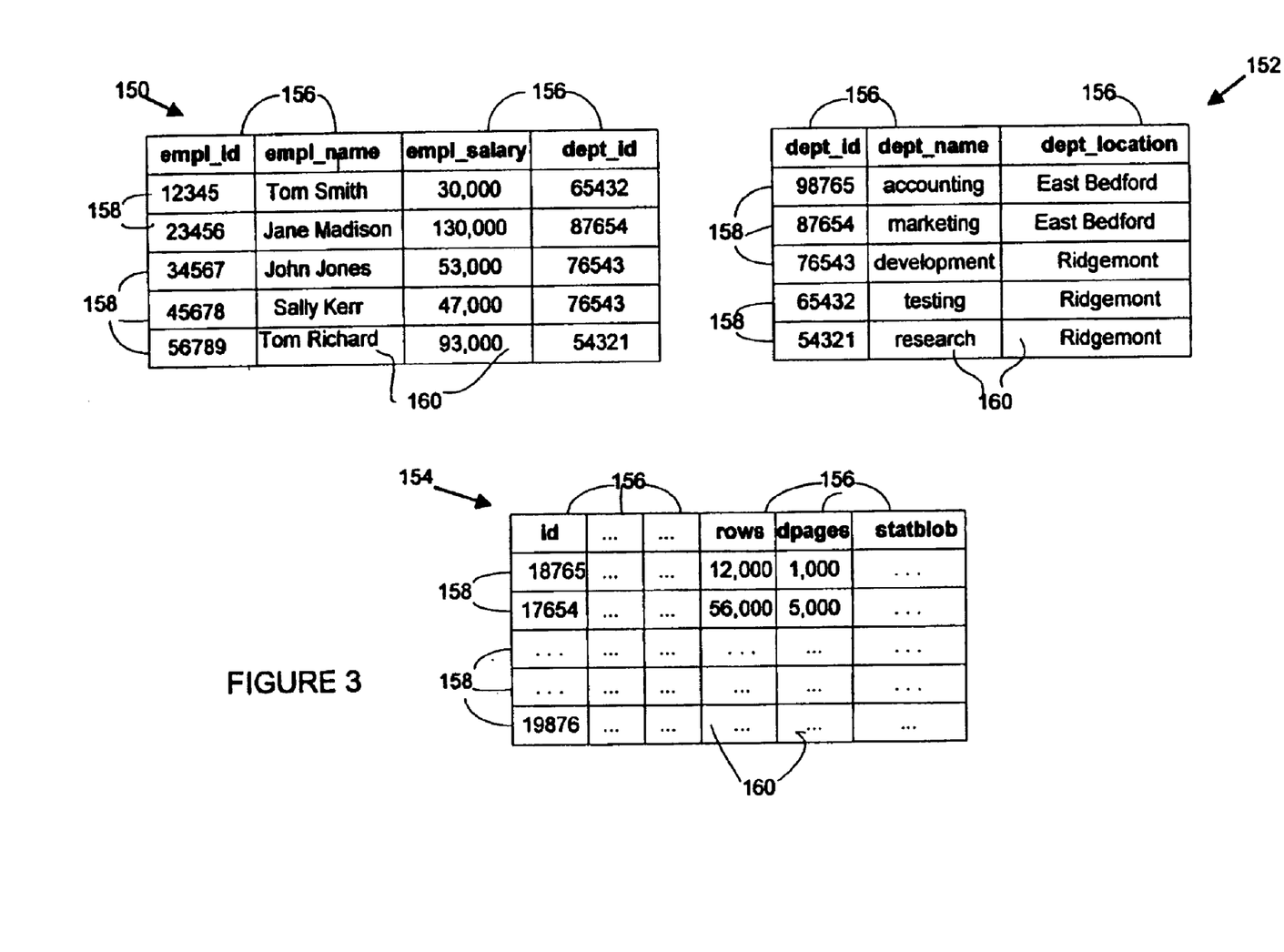
FIG. 3 is a diagram representing tables in an exemplary database.

FIG. 3 depicts a portion of the tables located in an exemplary relational database. As shown, the exemplary database comprises employee table 150, department table 152, and sysindexes table 154. Each table comprises columns 156 and rows 158 with fields 160 formed at the intersection. Employee table 150 comprises multiple columns 158 including empl_id, empl_name, dept_id, and empl_salary. Columns 158 in department table 152 include dept_id, dept_name, and dept_location. Sysindexes table 154 contains information regarding each table in the database. For example, statistics information such as is described below is stored in sysindexes table 154 along with other information related each table.

As previously noted, control and management of the tables is maintained by a DBMS, e.g., a RDBMS. An architecture for an exemplary RDBMS 90 is graphically depicted in FIG. 4. The architecture comprises essentially three layers. Layer one provides for three classes of integration with the RDBMS, comprising: (1) a SQL Server Enterprise Manager 92 that provides a common environment for managing several types of server software in a network and provides a primary interface for users who are administering copies of the RDBMS on the network; (2) an Applications Interface 93 that allows integration of a server interface into user applications such as Distributed Component Object Modules (DCOM); and (3) a Tools Interface 94 that provides an interface for integration of administration and configuration tools developed by Independent Software Vendors (ISV).

Figure 4:
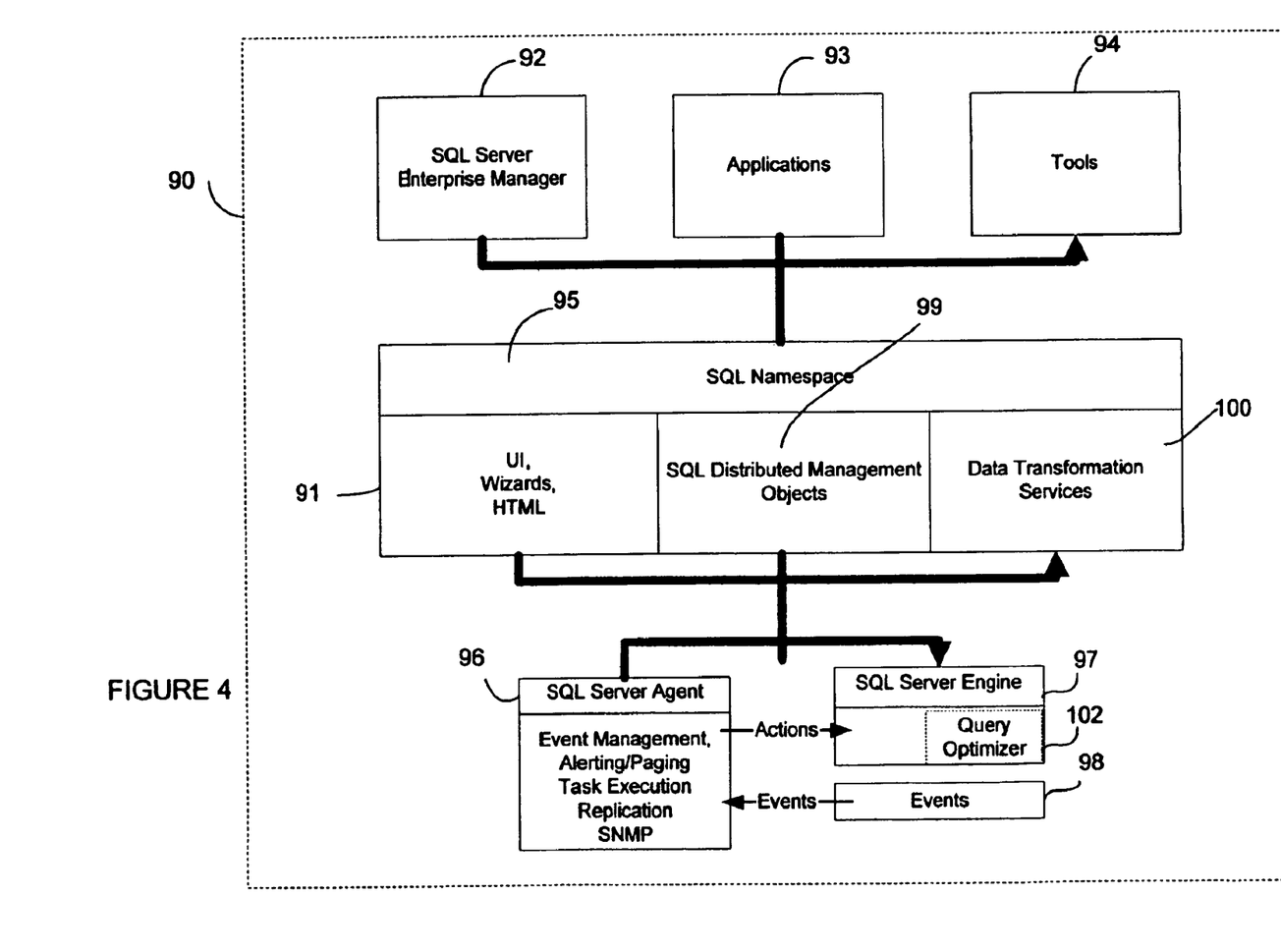
FIG. 4 is a graphical depiction of an architecture for an exemplary RDBMS.

Layer two opens the functionality of the RDBMS to other applications by providing three application programming interfaces (API): SQL Namespace 95, SQL Distributed Management Objects 99, and Data Transformation Services 100. A user interface 91 is provided by Wizards, HTML, and so on. SQL Namespace API 95 exposes the user interface (UI) elements of SQL Server Enterprise Manager 92. This allows applications to include SQL Server Enterprise Manager UI elements such as dialog boxes and wizards.

SQL Distributed Management Objects API 99 abstracts the use of DDL, system stored procedures, registry information, and operating system resources, providing an API to all administration and configuration tasks for the RDBMS.

Distributed Transformation Services API 100 exposes the services provided by the RDBMS to aid in building data warehouses and data marts. As described more fully below, these services provide the ability to transfer and transform data between heterogeneous OLE DB and ODBC data sources. Data from objects or the result sets of queries can be transferred at regularly scheduled times or intervals, or on an ad hoc basis.

Layer three provides the heart of the RDBMS. This layer comprises a SQL Server Engine 97 and a SQL Server Agent 96 that monitors and controls SQL Server Engine 97 based on Events 98 that inform SQL Server Agent of the status of the SQL Server Engine 97. Server Engine 97 processes SQL statements, forms and optimizes query execution plans, and so on. Server Engine 97 may comprise a component referred to as "query optimizer" 102 which operates to select execution plans as described in detail below with reference to FIG. 8.

Generally, data stored in a relational database is accessed by way of a user-defined query that is constructed in a query language such as SQL. Typically, for any given SQL query there are numerous procedural operations that need be performed on the data in order to carry out the objectives of the SQL query. For example, there may be numerous joins and table scans that need to be performed so as to accomplish the desired objective. These table joins and scans can often be executed in various different orders to arrive at the same result. A combination of procedural operations which accomplishes the desired objective is referred to as an "execution plan." There may be numerous execution plans that can be developed for any one SQL query.

A database management system must automatically select one execution plan to implement from the numerous execution plans that may exist for a SQL query. One frequently employed criteria for choosing an execution plan is to select the plan which provides the greatest efficiency, i.e. involves minimal use of system resources such as processing cycles and logical I/O's.

In database systems which select an execution plan based on efficiency, the system considers the table scans and table joins, as well as the ordering of these, that accomplish the desired objective with use of minimal system resources. Generally, a plan that requires processing a minimal number of database records also uses minimal system resources. Thus, a key principle for selecting the most efficient execution plan is to select the plan that minimizes the number of database records that need to be processed.

Database statistics play an essential role in identifying execution plans that require processing of minimal numbers of records. Generally, database systems can be programmed to generate statistics on data stored in selected database columns. Database statistics typically include the following: the time of the last statistics collection; the number of rows in the table in which the column is stored; the approximate number of pages occupied by the data stored in the column; the average length of the data stored in the column; the distribution of values in the column (i.e. a histogram); the densities of values in the column; and the number of column values used to produce the histogram and density information.

Histogram and column density statistics provide a means to estimate the expected number of records that may be returned by a database operation and are therefore particularly useful in identifying an efficient execution plan. Density refers to the uniqueness of data values in a column. "Density" is defined as 1/reduced cardinality where reduced cardinality is the number of different values in a column after the most frequent values have been removed. Another type of density, sometimes referred to as "all density" is defined as 1/cardinality where cardinality is the number of different values in a column.

Generally, density provides a measure of selectivity for an index. The more selective an index, the more useful it may be in accessing only the desired records and thereby eliminating more rows from consideration. Thus, a database system considering using two alternative indexes will typically employ the more selective index as indicated by the density.

A histogram represents the distribution of values in an column. Generally, in order to create a histogram, the records in a column are sorted and divided into intervals. The beginning and ends of the intervals are defined by discrete values in the column. In an equi-height histogram, the values are evenly distributed into intervals. In a multi-height histogram, the values are irregularly distributed into intervals but the number of values in each interval are defined.

Figure 5:
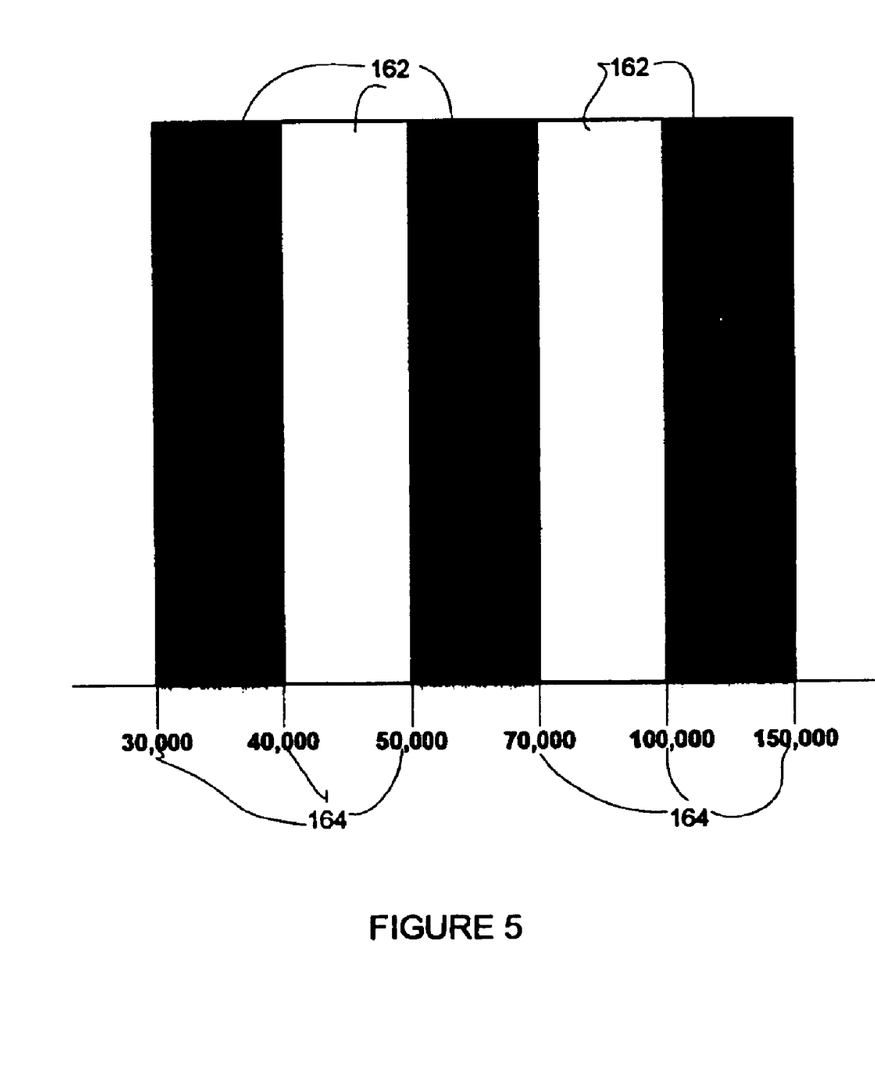
FIG. 5 is an exemplary histogram.

FIG. 5 provides an exemplary equi-height histogram for the "salary" column of employee table 150 shown in FIG. 3. There are five intervals or "steps" 162 created by six end values 164. Because the histogram is of the equi-height variety, the number of entries in each of intervals 162 is presumed to be equal. For example, if there are 2000 records in all of employee table 150, each of steps 162 in the histogram contains 400 entries. Thus, if as part of an execution plan it is necessary to locate all employees with salaries greater than $100,000, the histogram indicates that at most 400 records might need to be accessed in order to process that particular limitation of the execution plan. With this estimate for the maximum number of records that need potentially be accessed to complete this particular portion of the execution plan, the database system can evaluate where this query step ought to be placed relative to the others in order to arrive at an efficient execution plan.

Figure 6:
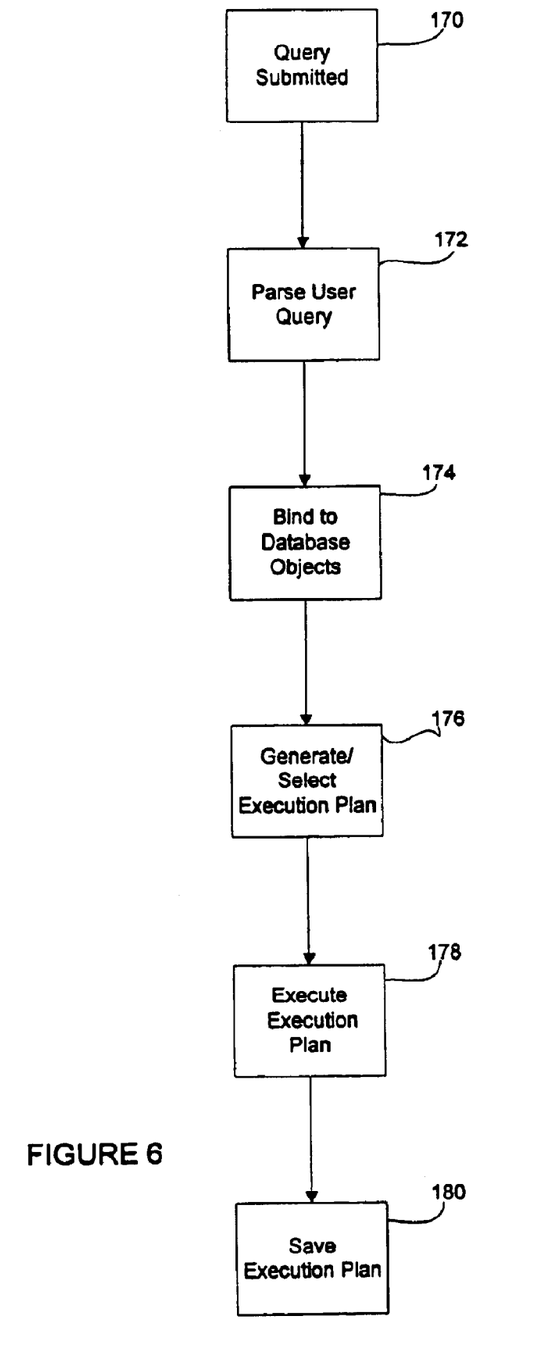
FIG. 6 is a flow diagram of a process for processing a query.

FIG. 6 is a high level flow chart of steps typically involved in query processing. For the exemplary organization database of FIG. 3, a user may desire to know the number of employees in each department of the organization that is located in East Bedford. Accordingly, the user may submit at step 170 the following SQL query (using standard ANSI SQL92 syntax):

SELECT D.dept_name, count(*) AS num_employees

FROM Department AS D INNER JOIN Employees AS E ON

D.dept_id=E.dept_id

WHERE D.dept_id='East Bedford'

GROUP BY D.dept_id, D.dept_name

Figure 7:
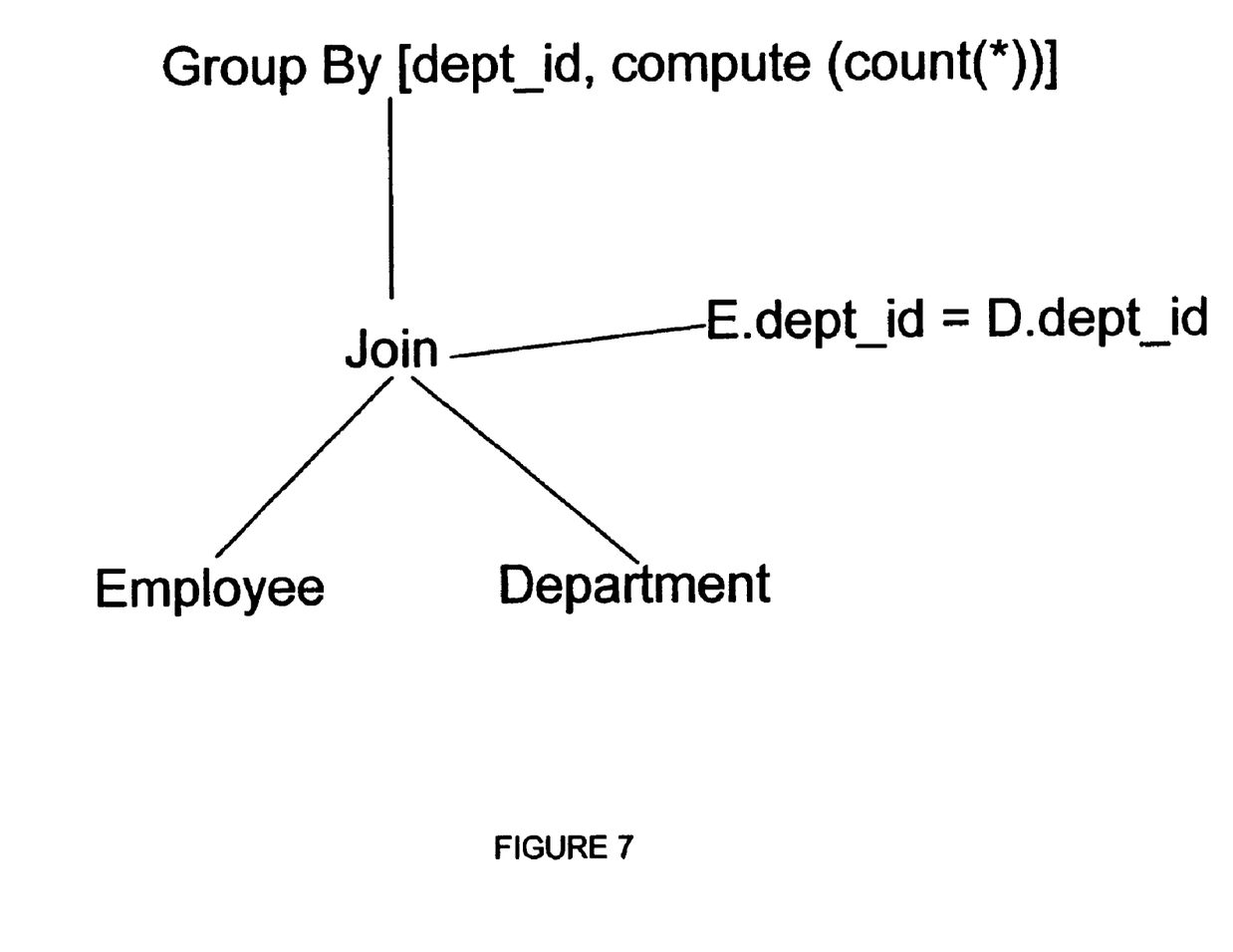
FIG. 7 is a tree diagram corresponding to an exemplary SQL query.

At step 172, the database management system parses the SQL query, checking for proper SQL syntax and translating the SQL commands into a database internal format that can be operated upon. In one embodiment the internal format is a sequence tree or query tree. A query tree for the above described SQL query is shown in FIG. 7.

At step 174, the database management system binds the text strings in the query tree with objects in the database and resolves information about those objects. For the above example, the strings "employee" and "department" are respectively bound to the employee and department tables in the database and the names and data types of the columns in those tables are resolved.

At step 176, a component of the database management system usually referred to as the "query optimizer" selects an optimal execution plan. Generally this is accomplished by first generating a plurality of execution plans, any one of which would fulfill the objectives of the SQL query. Thereafter, the query optimizer selects one of the execution plans, usually the one deemed to be most efficient. This selection process typically involves analyzing statistics as described above to minimize the number of record accesses.

At step 178, the database system executes the execution plan that was selected at step 176. At step 180, the execution plan is stored in an area of memory referred to as the "execution plan cache." On subsequent invocations of the same SQL query, rather than re-traverse the optimization process, the previously optimized execution plan is retrieved from cache and executed.

In a database system which relies on the accuracy of database statistics to select execution plans, it is desirable to refresh the statistics when the underlying data has changed. A system which provides this capability is disclosed in commonly assigned U.S. patent application Ser. No. 09/212/933, entitled "Automatic Database Statistics Maintenance and Plan Regeneration" the contents of which are hereby incorporated by reference in their entirety. As disclosed therein, a counter may be maintained of updates made to data for the purpose of determining when the data has sufficiently changed such that the statistics should be refreshed. In one embodiment, a counter, typically referred to as the "row modification counter" is maintained for each table in the database for which statistics have been generated. The row modification counter is incremented by one for every update, insert, or delete to a column in the table for which statistics are being maintained. In an alternative embodiment, the row modification counter may be maintained for every database column for which statistics are being kept. In this alternate embodiment, a row modification counter is incremented by one for every update, insert, or delete made to the particular column.

Figure 8:
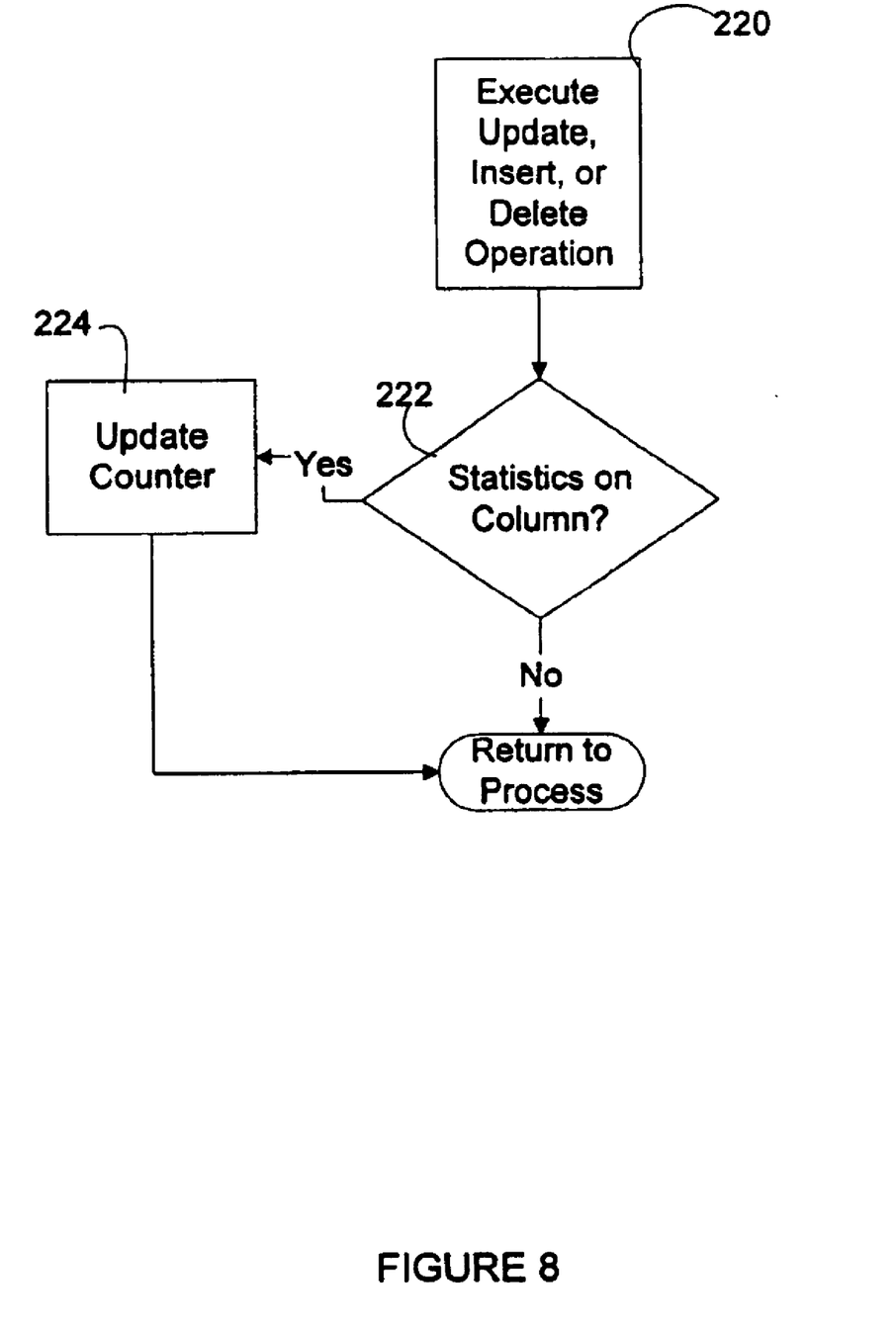
FIG. 8 is a flow diagram of a process for implementing an execution plan.

When an execution plan is implemented, the row modification counters for each table accessed by the plan are incremented for every update, insert, and delete operation performed on a column in the respective tables for which statistics are being maintained. FIG. 8 illustrates one method of updating a modification counter during execution of an execution plan on a database. As shown, at step 220 an update, insert, or delete associated with an execution plan is executed in the database. At step 222, it is determined if the update, insert, or delete was performed on a column for which statistics are being maintained. If a column for which statistics are being kept has been updated, at step 224, the row modification counter for the table in which the updated column is located is incremented.

When the row modification counter for a particular table reaches a threshold value, the statistics related to that table are updated. Threshold values are likely to vary between tables. Further, while a threshold may be a set value, it preferably is a non-constant function. For example, the modification threshold may be defined by the following function:

modification threshold=max (500, record_count *0.20)

where record_count is the number of records in the particular table. According to this exemplary function, for a table containing 11,000 records the modification threshold would be 2,200.

In a database system which stores for later implementation, execution plans which were generated based upon database statistics, it is desirable to periodically update the stored execution plans to correspond to changes in the database statistics. Accordingly, the database system may determine if the execution plan is sensitive to changes in the statistics of the tables accessed by the plan. If the execution plan is sensitive to statistics on a particular table, the plan is automatically re-optimized. In one embodiment, the system maintains a version referred to as a "statistic schema version" for each table for which statistics have been generated. When the statistics are updated for a particular table, the statistic schema version is automatically incremented. The statistic schema version for each table accessed by an execution plan at the time the plan is generated is stored with the execution plan. Prior to implementing an execution plan, the database system examines the execution plan to determine if the plan operates on tables for which statistics are maintained. For each table accessed by the execution plan for which statistics are maintained, the current statistic schema version is compared with the value for the statistic schema version at the time the execution plan was generated. If the statistics for the table have changed as indicated by a change in statistic schema version, the execution plan is no longer valid and a new execution plan is generated using new statistics.

Figure 9:
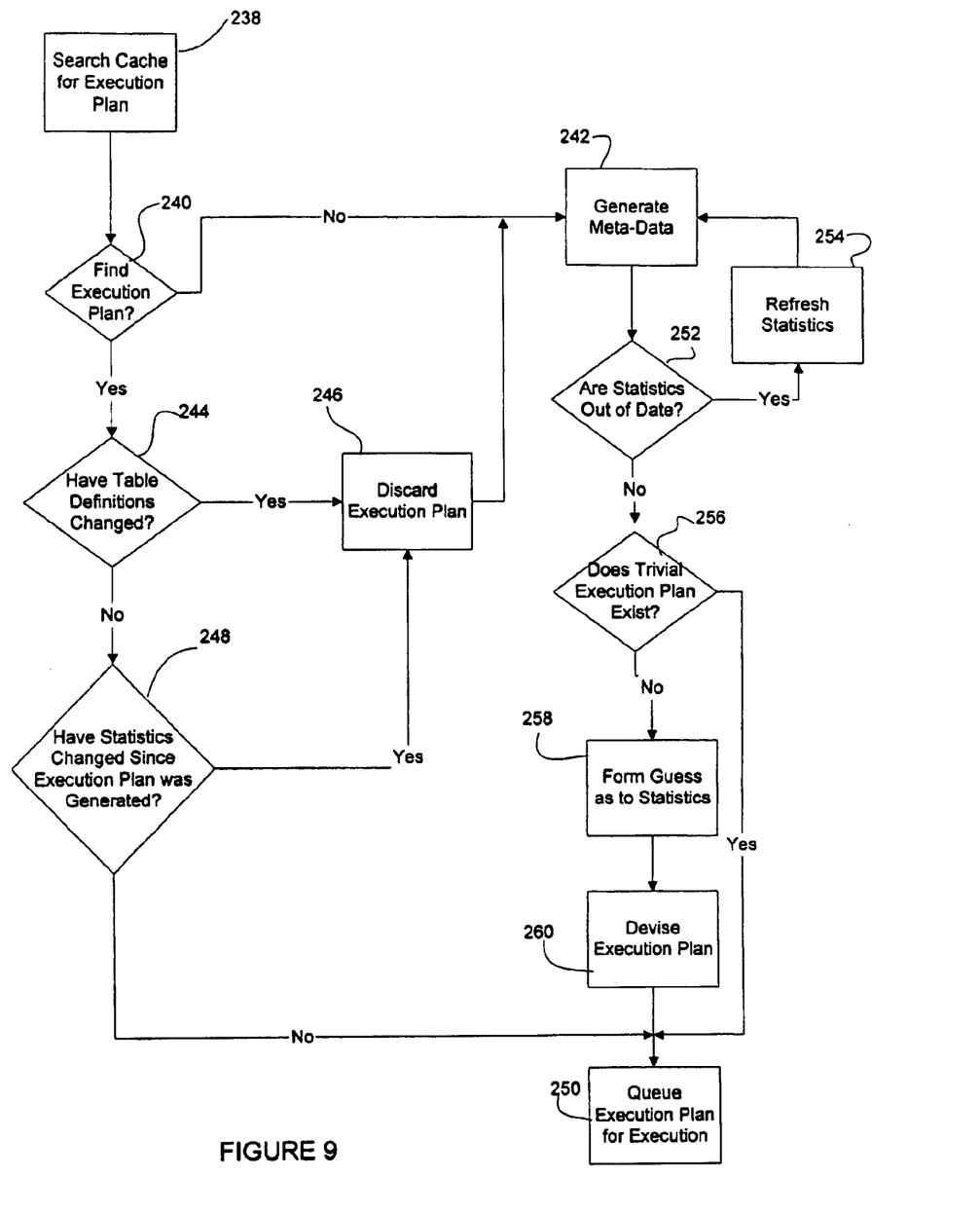
FIG. 9 is a flow diagram of a process for generating an execution plan.

FIG. 9 provides a detailed flow chart of the steps involved with optimization step 176 of FIG. 5. At step 238, the database system searches the execution plan cache for a previously identified execution plan that corresponds to the SQL query which has been applied to the database. If at step 240 an execution plan is not found in cache, at step 242 meta-data for the query is developed. If at step 240 an execution plan is found in cache, at step 244 the database system attempts to verify that the plan is still valid. Typically this involves, but is not limited to, verifying that the definition of all tables accessed by the execution plan have not changed since the plan was generated. This table definition check is referred to as a "schema check." Each object, for example a table, stored in a database system might have a "schema version." The schema version uniquely identifies a specific state which existed or currently exists for an object. When a modification to the schema of an object is made, the schema version is automatically incremented.

When an execution plan is generated by the database system, the schema versions for all tables referenced in the plan are stored as part of the plan. At step 244, the schema versions of the tables accessed in the plan are checked against the current schema versions. If any of the schema versions accessed as part of the plan have changed since the execution plan was generated as indicated by a change in schema version, the plan is no longer valid, and at step 246 the system typically, but not necessarily, automatically discards the plan and re-submits the query to produce a new execution plan using the new schema versions.

If at step 244 the table schemas have not changed, at step 248 a determination is made as to whether the statistics for any of the tables accessed by the execution plan have changed since the plan was developed. In one embodiment this determination is made by comparing each table's statistic schema version with the statistic schema version that is stored with the execution plan. If the current statistic schema version does not match the value for the statistic schema version stored with the execution plan, this indicates that the statistics on the table have been updated since the execution plan was generated. Under this set of facts, at step 246 the execution plan is discarded and a new plan developed beginning at step 242. If at step 248 it is determined that the statistics have not changed for any of the tables accessed by the execution plan, the execution plan is queued for execution at step 250.

If at step 240 an execution plan is not located, or an execution plan has become outdated and discarded at step 246, at step 242 meta-data is generated. Generally, meta-data includes statistics that exist for columns that potentially may need be accessed by the execution plan. Additionally, the meta-data comprises a list of columns that need to be accessed but for which there have been no statistics generated.

At step 252 a determination is made as to whether the statistics for the tables have become outdated. According to one embodiment, this involves determining for each table involved in the query whether the row modification counter has breached the modification threshold for that table. If so, the statistics are out of date and the statistics for the particular table are refreshed at step 254. As part of refreshing the statistics for a table, the statistic schema version for the table is incremented. After refreshing the data, the meta-data is regenerated at step 242.

If at step 252 it is determined that the statistics are not out of date, i.e. for each table accessed by the execution plan the row modification counter has not reached the threshold value, at step 256 it is determined whether a "trivial" execution plan exists that satisfies the objectives of the submitted SQL query. For some queries, the most efficient plan is easily discerned, i.e. trivial. In such cases, further processing to develop an execution plan is an inefficient use of resources. For example, if a particular SQL Query can be satisfied by a simple index lookup, it can be assumed that there is no need to investigate other potential execution plans.

If a trivial plan is identified at step 256, the trivial plan is queued for execution at step 250. If at step 256, however, there is no satisfactory trivial plan, at step 258, for any columns that may be accessed by one of the plurality of possible execution plans and which was identified in the meta-data as not having statistics generated, a guess is made as to the number of records that may be returned from the particular column. Typically, existing systems employ fixed estimates for the portion of records which qualify for each class of comparison predicate. For example, a system might assign the following selectivity (portion of records which qualify) to portions of queries for which statistics have not been generated:

| Comparison | Selectivity |
|---|---|
| Less than | 30% |
| Greater than | 30% |
| Equal | 10% |

According to these exemplary measures of selectivity, for requests seeking record entries equal to a particular value, a guess is made that 10% of the entries in the column would satisfy the request. For requests seeking record entries less than a particular value or greater is than a particular value, it is assumed that 30% of the entries in the column would satisfy these criteria.

Using the statistics that are gathered at step 256 and/or guesses that are devised at step 258, an execution plan is devised at step 260. Stored with the execution plan is the statistic schema version for each statistic accessed by the execution plan. At step 250 the execution plan that has been selected is queued to be executed.

As noted above, relying upon guesses rather than actual statistics introduces inaccuracies to the process and can lead to the selection of a less than optimal execution plan. As a consequence, database queries may take longer and use more resources than optimally necessary.

Detailed Description of Automatic Database Statistics Creation

In a system according to the present invention, statistics are automatically generated as needed during the optimization process. According to another aspect of the invention, selected automatically generated statistics are removed from the database so as to avoid the accumulation of statistics across all rows in the database.

Figure 10:
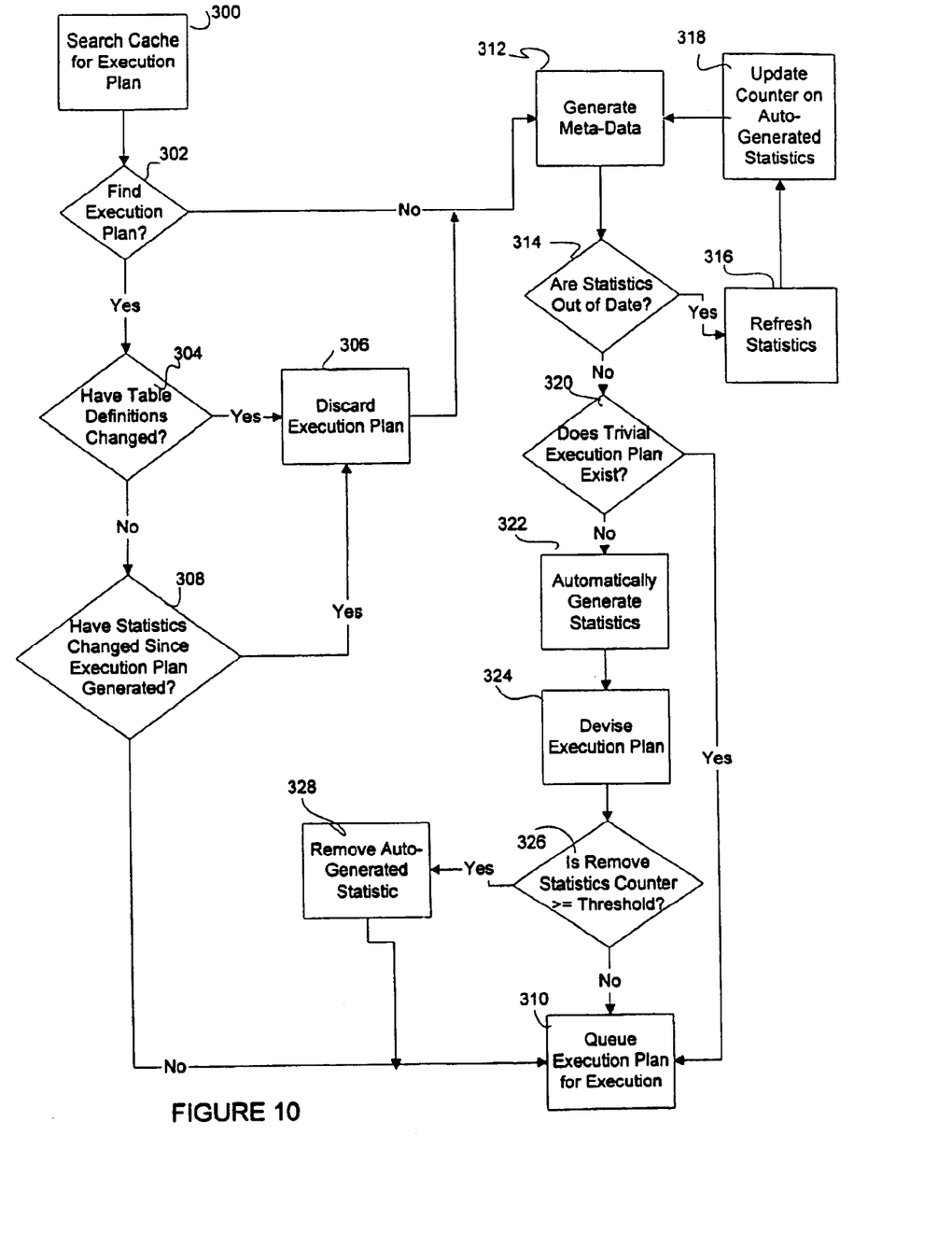
FIG. 10 is a flow diagram of a process in accordance with the present invention for generating an execution plan.

FIG. 10 provides a view of an optimization process in accordance with the present invention. As shown, at step 300, the execution plan cache is searched for an execution plan which corresponds to the SQL query submitted by the user. If an execution plan is found at step 302, at step 304 it is determined whether the table definitions for the tables accessed by the execution plan have changed since the execution plan was generated. Generally, this determination involves comparing the schema versions for the tables accessed by the plan that were stored with the execution plan when the plan was generated, with the current schema versions for the tables. If the schema versions for any of the tables have changed, the execution plan is discarded at step 306. If the table definitions have not changed, at step 308 it is determined whether the statistics from which the execution plan was generated have changed since the execution plan was generated. Generally, this determination involves comparing each statistic schema version that was stored with the execution plan when the plan was generated, with the corresponding current statistic schema version. If the statistics have changed, the execution plan is discarded at step 306. If the statistics have not changed, at step 310 the execution plan is queued for execution.

If at step 302 no execution plan was found, or the execution plan was discarded at step 304, at step 312 meta-data is generated corresponding to the user's query. At step 314, it is determined whether the statistics gathered as part of the meta-data are out of date. This determination may be made by comparing for each table accessed as part of the query the row modification counter with the row modification threshold corresponding to the particular table. If the statistics are found to be out of date, at step 316 the statistics are refreshed and at step 318 the statistics update counter is incremented for each automatically generated statistic defined in the meta-data. As explained in detail below, a statistic update counter is created for each automatically generated statistic and is employed in determining whether to remove the statistic from the database. At step 312 the meta-data is regenerated to reflect the updated statistics.

If at step 314, the statistics are found not to be out of date, at step 320 it is determined whether a trivial execution plan exists. If so, the trivial execution plan is queued for execution at step 310. If at step 320 a trivial execution plan is found not to exist, at step 322 statistics are automatically generated for the set of data which are identified in the meta-data as not having had statistics. At step 324 an execution plan is devised using the statistics generated at steps 312 and 322.

At step 326 a determination is made as to whether the automatically generated statistics that are accessed by the execution plan should be removed from the system. In one embodiment of the invention, this involves determining whether the statistic update counter for a statistic has breached a threshold value. The threshold value is typically, but not necessarily set at a constant value for an entire database. Alternatively, the threshold could be a function of the data. According to this method of selecting statistics to be removed, the statistics that are frequently updated and thereby add most significantly to the system overhead are most likely to be removed from the system. Of course, other criteria could be used for selecting statistics to be removed. If during future operations of the query optimizer a statistic that has been removed is needed, the statistic is re-generated using the auto-generation process described above.

If it is determined that the automatically generated statistic should be removed, at step 328, the statistic is removed from the system and thereafter at step 310 the execution plan is queued for execution. If it is determined that there are no automatically generated statistics to be removed, the execution plan is queued for execution at step 310.

Figure 11:
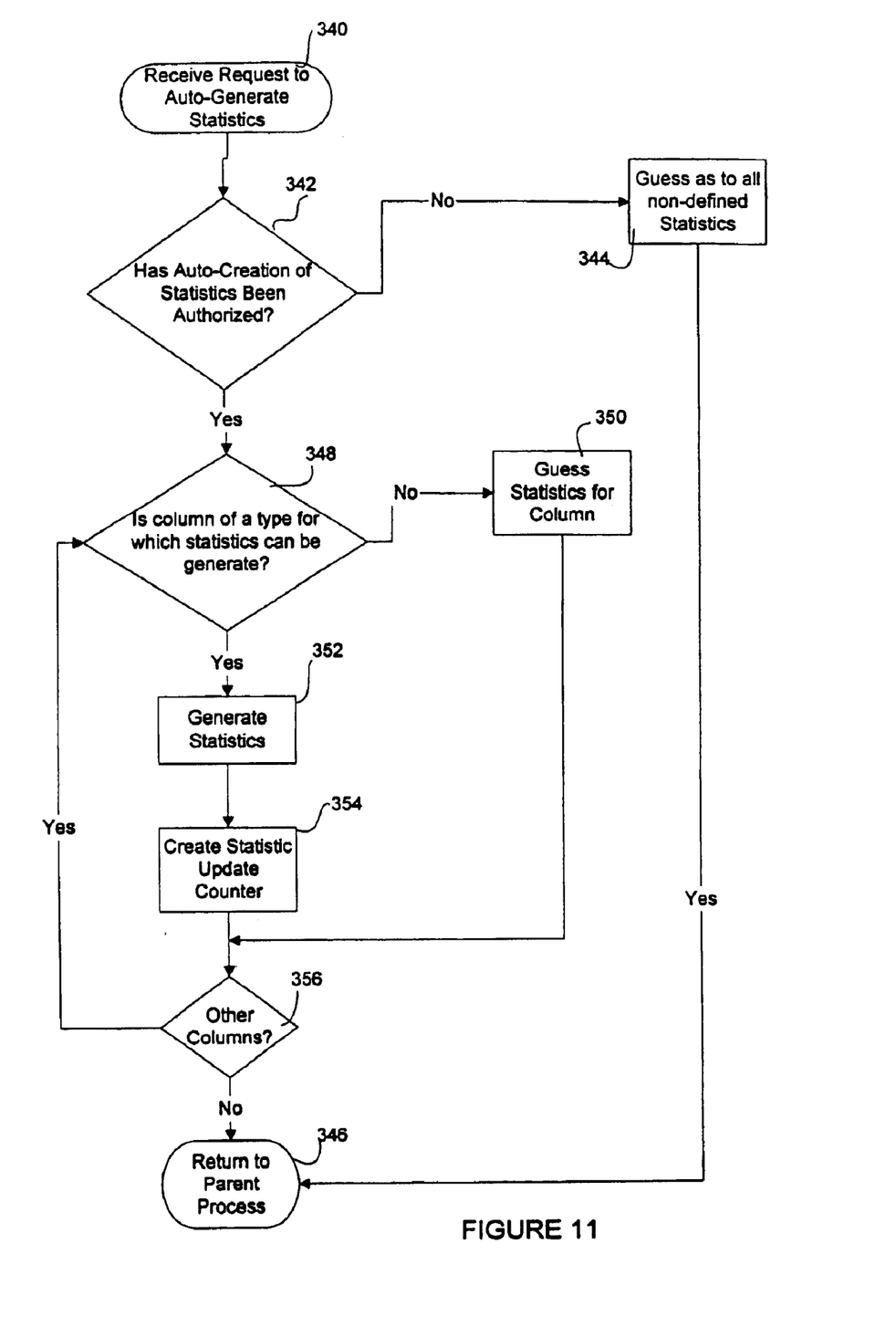
FIG. 11 is a flow diagram of a process in accordance with the present invention of automatically generating statistics.

FIG. 11 provides a flow chart of the steps involved in one embodiment of automatically generating statistics. At step 340, a request is received to automatically generate statistics. In a preferred embodiment, requests to automatically generate statistics comprise the names of the specific columns, grouped by table, for which it is necessary to generate statistics. At step 342 it is determined whether automatic creation of statistics has been authorized for the particular database. In some circumstances a database administrator may not want to employ automatic generation of statistics. For example, a database administrator may decide that the automatic generation of statistics will add too significantly to the overhead of the system. If automatic generation of statistics has not been enabled in the system, at step 344 guesses are made for the statistics using methods such as those described above. Thereafter, at step 346, control is returned to the parent process.

If at step 342, it is determined that automatic generation of statistics has been enabled, at step 348 it is determined for each column for which statistics are needed, whether the column is a type for which statistics can be generated. For example, statistics are not generated for columns that have been marked as read-only. Also, statistics are not typically generated for columns containing text, graphs, or those containing more than 900 characters.

If at step 348 it is determined that a column is not one for which statistics are generated, at step 350, a guess is made as to the statistics for the particular column. If at step 348, the column is of a type for which statistics are generated, at step 352 statistics are generated for the particular column. At step 354 a statistics update counter is created for that particular statistic. The counter is used as described above in relation with step 326 to determine if the statistic should be removed from the database. The statistics update counter is stored with the automatically generated statistic, typically in sysindexes table 154.

At step 356, it is determined if there are other columns for which it has been requested to generate statistics. If so, at step 348 it is determined whether the column is of a type for which statistics are maintained. If at step 356 there are no additional columns, processing is returned to the parent process.

As described above, the present invention provides a system for automatic database statistics creation. A database in accordance with the present invention minimizes guessing as to statistics and thereby provides more efficient query processing.

Those skilled in the art understand that computer readable instructions for performing the above described processes can be generated and stored on a computer readable medium such as a floppy disk or CD-ROM. Further, a computer such as that described with reference to FIG. 1 may be arranged with other similarly equipped computers in a network, and each computer may be loaded with computer readable instructions for performing the above described processes. Specifically, referring to FIG. 1, microprocessor 21 may be programmed to operate in accordance with the above described processes.

While the invention has been described and illustrated with reference to specific embodiments, those skilled in the art will recognize that modification and variations may be made without departing from the principles of the invention as described above and set forth in the following claims. In particular, the invention may employed with any type of database including those not in relational format. Further, the invention may be employed in any database that uses statistics in any way to select a plan for processing a user defined query. Also, the statistics may be of any type and are not limited to those described above. Indeed, the statistics may be derived for single columns of data, multiple columns of data or for any other division of data. Accordingly, reference should be made to the appended claims as indicating the scope of the invention.

What is claimed is:

1. A computer having stored in memory computer-executable instructions for operating a query optimizer for selecting an executable procedure from a plurality of procedures that operate on data in a database, wherein said query optimizer automatically generates a statistic derived from data that is operated upon by one of a plurality of procedures; generates a statistic update counter for said statistic; selects the executable procedure from the plurality of procedures based on said statistic; increments said statistic update counter when said statistic is updated; and automatically removes said statistic if said statistic update counter breaches a threshold.

2. A method for selecting an executable procedure from a plurality of procedures that operate on data in a database, comprising the steps of:
   a) automatically generating a statistic derived from data that is operated upon by one of the plurality of procedures; and
   b) selecting the executable procedure from the plurality of procedures based on said statistic.

3. A method for selecting an executable procedure from a plurality of procedures that operate on data in a database, comprising the steps of:
   a) determining that a statistic does not exist for data operated upon by at least one of a plurality of procedures;
   b) generating said statistics;
   c) selecting one of said plurality of procedures using said statistic.

4. A computer-readable media having stored thereon computer-executable instructions for performing the steps recited in claim 3.

5. A method for avoiding the accumulation of statistics in a database wherein statistics are automatically generated, comprising the following steps:
   a) creating a statistics update counter for an automatically created statistic;
   b) incrementing said counter when said statistic is updated; and
   c) removing said automatically created statistic when said counter breaches a threshold value.

6. A computer-readable media having stored thereon computer-executable instructions for performing the steps recited in claim 5.

7. A method for automatically generating statistics for data in a database, comprising the following steps:
   a) determining if automatic creation of statistics has been authorized in the database;
   b) if automatic creation of statistics has not been authorized in the database, forming a guess as to the statistics;
   c) if automatic creation of statistics has been authorized in the database, determining if the data is of a type for which statistics can be generated in the database;
   d) if the data is of a type for which statistics can be generated in the database, generating the statistics; and
   e) if the data is of a type for which statistics can not be generated in the database, forming a guess as to the statistics.

8. A computer-readable media having stored thereon computer-executable instructions for performing the steps recited in claim 7.

9. The computer of claim 1, wherein said threshold value is a constant.

10. The computer of claim 1, wherein said threshold value is a function of the data.

11. The method of claim 2, wherein the data is organized in tables formed from columns and rows and said step of automatically generating a statistic comprises automatically generating a statistic for a selected column.

12. The method of claim 11, further comprising determining if said selected column is of a type for which a statistic can be generated.

13. The method of claim 3, wherein the data is organized in tables formed from columns and rows and said step of generating a statistic comprises automatically generating a statistic for a selected column.

14. The method of claim 13, further comprising determining if said selected column is of a type for which a statistic can be generated.

15. The method of claim 5, wherein said threshold value is a constant.

16. The method of claim 5, wherein said threshold value is a function of the data.

17. The method of claim 7, wherein the data is organized in tables formed from columns and rows and said step of generating a statistic comprises automatically generating a statistic for a selected column.

* * * * *